United States Patent
Christy et al.

(10) Patent No.: US 10,479,623 B2
(45) Date of Patent: Nov. 19, 2019

(54) SLUDGE HANDLING SYSTEM WITH ROTATING DISCHARGE DEVICE

(71) Applicant: RDP Technologies, Inc., Conshohocken, PA (US)

(72) Inventors: Richard W. Christy, Eagleville, PA (US); Michael Quici, Ambler, PA (US); Michael J. Millman, Gilbertsville, PA (US)

(73) Assignee: RDP TECHNOLOGIES, INC., Conshohocken, PA (US)

( * ) Notice: Subject to any disclaimer, the term of this patent is extended or adjusted under 35 U.S.C. 154(b) by 45 days.

(21) Appl. No.: 15/945,032

(22) Filed: Apr. 4, 2018

(65) Prior Publication Data

US 2019/0308828 A1    Oct. 10, 2019

(51) Int. Cl.
  *B65G 65/48* (2006.01)
  *C02F 11/121* (2019.01)
  *B01D 21/18* (2006.01)
  *B01D 21/24* (2006.01)

(52) U.S. Cl.
  CPC ......... *B65G 65/4809* (2013.01); *B01D 21/18* (2013.01); *B01D 21/245* (2013.01); *C02F 11/121* (2013.01)

(58) Field of Classification Search
  CPC . B65G 65/4809; C02F 11/121; B01D 21/245; B01D 21/18
  See application file for complete search history.

(56) References Cited

U.S. PATENT DOCUMENTS

| | | | |
|---|---|---|---|
| 3,653,511 A * | 4/1972 | Gustavsson | B01D 21/0024 210/112 |
| 8,662,354 B2 | 3/2014 | Christy et al. | |
| 8,939,329 B2 | 1/2015 | Christy et al. | |
| 2012/0205319 A1* | 8/2012 | Christy | C02F 1/02 210/737 |
| 2012/0207569 A1* | 8/2012 | Christy | B65G 65/4809 414/310 |
| 2012/0308349 A1* | 12/2012 | Christy | C02F 11/00 414/325 |
| 2013/0146619 A1* | 6/2013 | Ozawa | B65G 65/46 222/236 |
| 2018/0319691 A1* | 11/2018 | Baxter | C02F 11/121 |
| 2019/0010071 A1* | 1/2019 | Reijer Picozzi | B01D 29/15 |

* cited by examiner

*Primary Examiner* — Donnell A Long
(74) *Attorney, Agent, or Firm* — Paul & Paul

(57) ABSTRACT

A sludge handling system includes a bin from which treated sewage sludge is discharged. A rotatable discharge device includes an arm for scraping the inside of the bin and a frusto-conical chute from which sludge is discharged through a gate to a waiting truck. A stationary scoop is provided mounted on the gate to scrape the interior wall of the chute of adhering sludge.

16 Claims, 2 Drawing Sheets

SLUDGE HANDLING SYSTEM WITH ROTATING DISCHARGE DEVICE

BACKGROUND OF THE INVENTION

Historically the disposal of the sewage sludge residual solids at a biological wastewater treatment plant has been a significant operating expense. As a result, efforts have been made to minimize the volume through dewatering the residuals. Dewatering devices squeeze the water out of the semi-solids sewage sludge cake through pressure, over a period of time. Ten to twenty years ago dewatering would produce a cake to about 15-20% solids. Recent improvements in dewatering removes even more water, reducing transportation cost even further. A consequence of the drier solids is a greater resistance to the rate of flow when loading sewage sludge cake into trucks. Often the trucking is subcontracted to private haulers. The longer it takes to load a truck the more expensive the cost of disposal becomes.

Typically, wastewater treatment plants dewater sewage sludge for several days in a row. During that time they will gradually fill up their sewage sludge storage bins over a period of a day to weeks. In some cases, the bins can hold as much as 50 cubic yards of material, which may weigh as much as 100,000 pounds. Therefore, compaction occurs over time. A natural consequence of storing a high volume of residual solids over an extended period of time is an increase in viscosity, because sewage sludge cake is a dilatant material. Therefore if the material is at rest and the weight is increasing every day the dewatered sewage sludge cake will become increasingly more difficult to move.

In sludge handling systems, sludge resides in storage bins until it is desired to discharge sludge from the bins. Generally, one or more bins are provided, and the sludge is delivered into the bins at upper ends thereof, and is discharged from the bins through a discharge opening at a lower end of each bin. Generally, the discharge opening is closed until it is desired to discharge from the bin, and at that point, an openable closure is activated, opening the discharge opening at the bottom of the bin, to allow sewage sludge in the bin to be discharged from the bin, generally through a chute to direct the sludge onto the bed of a waiting truck disposed therebeneath, with the sludge then being delivered to be used as agricultural ground cover, landfill, or the like, as may be desired.

Sometimes sludge resides in the bin for a day or more, such that it may become increasingly compacted, with sludge along side wall(s) of the bin becoming adhered to the side wall(s), such that when the discharge gate is opened, sludge may not readily flow outwardly of the bin, via gravity flow, also called mass flow, without some assistance. This can particularly occur, as the volume of sludge in the bin decreases, because the lower volume, or "head," results in a reduced weight or pressure condition. As the "head" thus decreases, the resistance to flow increases, as sludge tends to adhere to the walls.

One approach that has been used to minimize aggregation of sludge at the bottom of a bin is to provide a rotationally driven discharge arm, that may be of plow-like construction, to sweep across a bottom floor of the bin, pushing sewage sludge along the bottom floor of the bin toward a central opening. Such a discharge arm will generally be motor-driven, either at a constant speed or a variable speed, and will undercut sewage sludge that may have become compacted during the time that it has been in the bin.

Such devices as these that move a discharge arm across a generally horizontal surface at the bottom of a bin, can be effective in many situations.

However, the longer a bin has been in use, the interior surfaces of the side wall(s) of the bin can become rough due to rusting, or due to other phenomena, such that sewage sludge may not slide easily along sloped surfaces of the bin, downwardly toward a discharge opening, but, rather, may accumulate on sloped surfaces of the bin.

Examples of sludge handling systems equipped with rotationally driven discharge arms are disclosed, for example, in U.S. Pat. Nos. 8,939,329 and 8,662,354.

As the sludge dewatering processes become more efficient, there is an increasing need to be able to process and dispose of the resulting sludge in an efficient manner.

SUMMARY OF THE INVENTION

The present invention is directed to providing a sludge handling system comprising at least one bin, from which bin treated sewage sludge is discharged. The at least one bin has an inlet at an upper end for receiving sludge therein, a bottom central discharge opening for discharge of sludge therethrough, and side wall(s). At least portions of the side wall(s) are generally conically sloped toward the bottom central discharge opening.

The system also includes a rotatable discharge means. The rotatable discharge means preferably includes a rotably driven table, as well as at least one arm having an upper portion and a lower portion. The at least one arm is mounted for traversing proximate the sloped portions of the side wall(s) of the at least one bin, and for moving sludge from the sloped portions of the side wall(s) so that the sludge does not adhere to the sloped portions of the side wall(s) and is directed out the bottom central discharge opening, with the lower portion of the at least one arm being mounted on the rotably driven table.

The rotably driven table includes a rotationally symmetric chute. The rotationally symmetric chute has an upper end for receiving sludge from the bottom central discharge opening of the at least one bin. The rotationally symmetric chute also includes a lower end for discharging sludge. The rotationally symmetric chute has a wall extending between the upper end of the chute and the lower end of the chute.

The system also includes a discharge gate having an opening for receiving sludge from the lower end of the chute.

The discharge gate includes at least one scoop extending into the chute proximate the wall for dislodging sludge from the wall.

The rotatably driven table preferably includes motor means for driving the table from a periphery of the table. Preferably, the chute is generally conical, with the upper end of the chute having a greater diameter than the diameter of the lower end of the chute.

Preferably, a sealing means provides a peripheral seal between said bottom discharge opening of said bin and said rotatably driven table. Preferably, the peripheral seal is carried by said rotatably driven table for rotation therewith. Preferably, the peripheral seal is in sliding engagement against the bin at the bottom central discharge opening of the bin.

Preferably, the rotably driven table is generally rotationally symmetric.

Preferably, the sloped portions of the side wall(s) of the at least one bin have lower end(s) that terminate in the bottom central discharge opening, and wherein the bottom central discharge opening of the bin is generally cylindrical.

Preferably, the opening of the gate is rotationally symmetric.

Preferably, a sealing means provides a peripheral seal between the lower end of the chute and the opening of the gate. The peripheral seal is preferably carried by the chute. The peripheral seal is preferably in sliding engagement against the gate at the lower end of the chute.

Preferably, the sloped portions of the side wall(s) of the bin have lower end(s) that terminate in the discharge opening, and wherein the discharge opening is generally cylindrical.

Preferably, the at least one arm comprises a means for scraping sludge from the sloped portions of the side wall(s). Preferably, at least one arm is substantially at the same angle to the vertical as the sloped portions of the side wall(s). Preferably, the at least one arm is selectively rotatable depending upon the volume of sludge in the bin.

Objects and advantages of the present invention will be readily apparent from a reading of the brief figure descriptions, the detailed descriptions of the preferred embodiments, and the appended claims.

BRIEF DESCRIPTIONS OF THE DRAWING FIGURES

FIG. 1 is a partial vertical cross-sectional view of a bin of a sludge handling system, having sloped side wall(s) and a bottom discharge opening, and with a rotating blade-like discharge arm being illustrated, carried by a motor-driven rotating table that has a central discharge chute, where the arm may move along the inner sloped side walls of the bin, loosening sludge from the sloped side wall(s) of the bin and directing it toward the bin discharge opening, and through a rotatable discharge chute, to a grate, on which a stationary scoop is mounted to scape the inner wall of the chute.

DETAILED DESCRIPTION OF THE PREFERRED EMBODIMENTS

Figure 1:
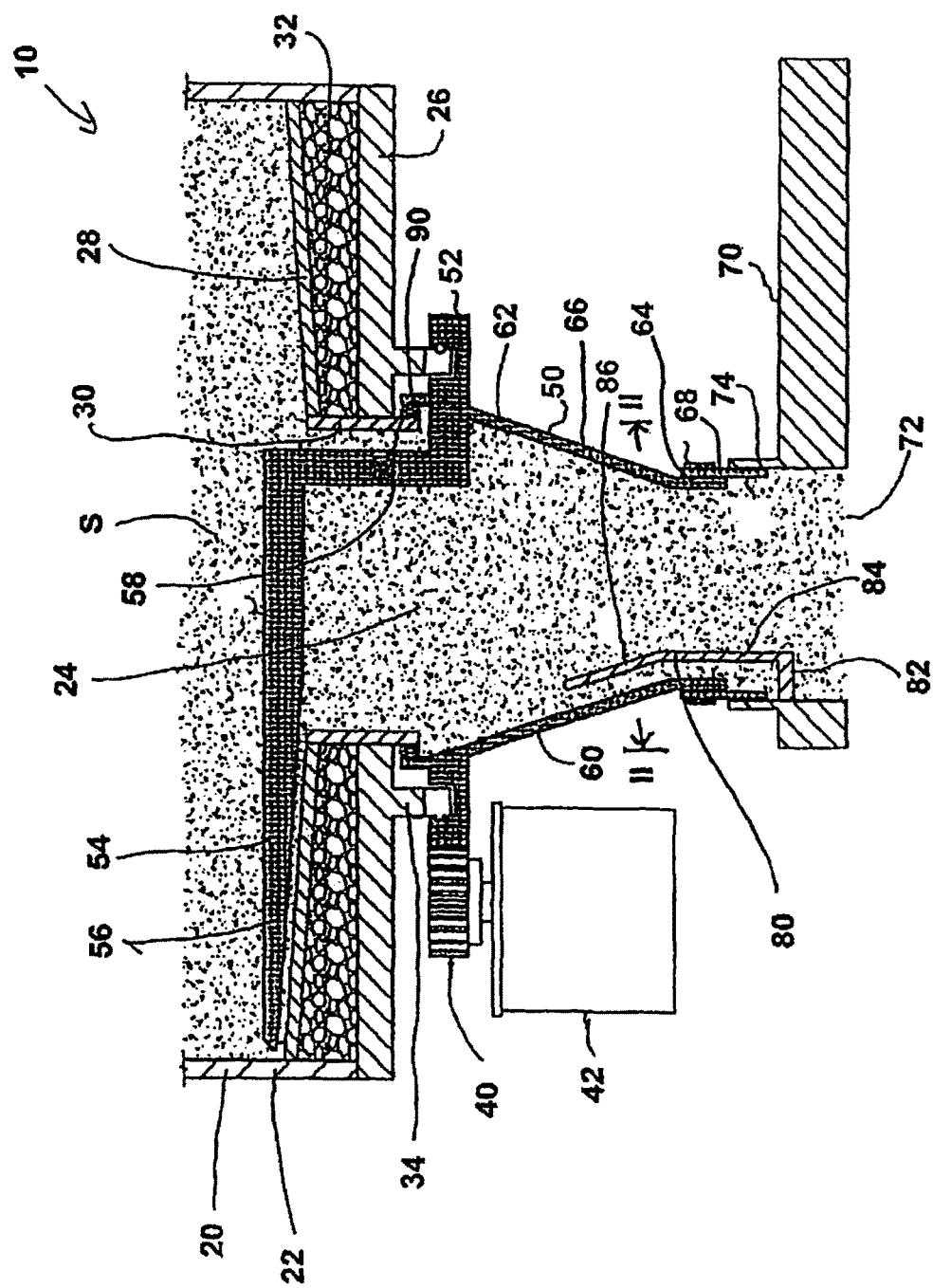

Referring now to the drawings in detail, reference is first made to FIG. 1, a fragmentary sectional view, wherein a sludge handling system 10 is provided, in which sewage sludge that has been treated with a treatment medium, generally a flocculant, and sometimes calcium appears as sewage sludge S, of generally clay-like consistency, provided into a bin 20, generally through an opening at an upper end thereof (not shown), and wherein the sludge accumulates in the bin 20, both along the generally vertical cylindrical inner walls 22 thereof, and as the sludge S moves downwardly through the bin 20, is directed toward a generally circular bottom discharge opening 24 thereof, after passing along conically sloped surface portions or side walls 28 at the bottom 26 of the bin 20. A generally cylindrical wall 30 surrounds the discharge opening 24. The generally cylindrical wall 30 extends from the sloped side walls 28 of the bin 20 and through the bottom 26 of the bin 20. A filler material 32 supports the sloped surface portions 28 on the bottom 26 of the bin 20. A generally cylindrical support ring 34 extends downward from the bottom 26 of the bin 20. The support ring 34 is concentric with the downwardly extending wall 30 and is spaced outward therefrom.

Rotatably attached to the support ring 34 by suitable bearings is a rotatable discharge means or device 50. The rotatable discharge device 50 includes a rotatable, generally circular plate-like ring or table 52 which rotatably engages the support ring 34. The outer edge of the generally circular table 52 is toothed, for engagement with a spur gear 40 mounted on a variable speed gear motor 42 for driving the rotatable discharge device 50. Extending upward from the generally circular table 52, and protruding through the discharge opening 24 of the bin 20 is an arm 54 having an upper portion 56 extending inside the bin 20 proximate the sloped surface portion or wall 28 of the bin 20 and a lower portion 58 extending upward from the generally circular table 52. When the table 52 is rotated by operation of the gear motor 42, the upper portion 56 traverses along the sloped portions 28 of the bin 20 so that sludge does not adhere to the sloped portions 28. Preferably, the arm 54 is selectively rotatable, depending on the volume, viscosity, moisture content, and/or other physical properties of the sludge in the bin 20, so that the speed of rotation, and/or the applied torque can be varied to efficiently and rapidly discharge the sludge from the bin 20. The rotatable discharge device 50 also includes a rotationally symmetric, generally frusto-conical chute 60 having an upper end 62 for receiving sludge from the discharge opening 24 of the bin 20 and a lower end 64 for discharging sludge from the chute 60, with a rotationally symmetric wall 66 extending between the upper end 62 and the lower end 64 of the chute 60.

The sludge handling system 10 also includes a discharge gate 70 for receiving sludge from the chute 60 through a generally circular aperture 72 formed in the upper surface of the discharge gate 70. The gate is provided with means for opening or closing the gate during discharge of sludge from the bin 20 (not shown). The discharge gate 70 includes a stationary scoop 80 mounted to extend within the chute 60. The scoop 80 includes a lower portion 82 extending from inside the aperture 72 in the gate 70, a middle portion 84 extending generally vertically, and an upper portion 86 extending generally parallel to the generally conical wall 66 of the chute 60. The scoop 80 is thus mounted to scrape the interior of the wall 66 of the chute 60 to dislodge any sludge which might otherwise adhere to the wall 66 and thus speed the flow of sludge through the discharge device 50. The gate 70 includes an upwardly extending wall or ring 74 surrounding the aperture 72. A generally circular peripheral, preferably elastomeric, seal 68 fixed to the chute 60, extends between the lower end 64 of the chute 60 and the upwardly ending gate wall 74 to prevent leakage of sludge during discharge of sludge from the bin 20. Similarly, a peripheral, preferably elastomeric, seal 90 is provided between the upper surface of the rotatable table 52 and the cylindrical wall 30 surrounding the discharge opening 24 of the bin 20 for the same purpose. The peripheral seal 90 is in sliding engagement against the bin 20 at the bottom central discharge opening 24 of the bin 20.

Figure 2:
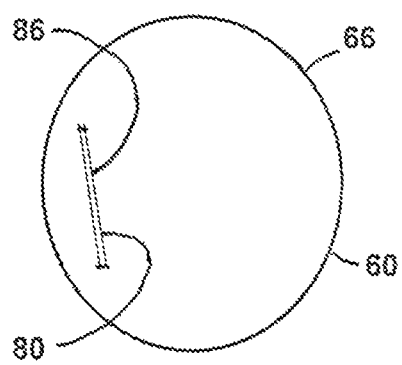
FIG. 2 is a transverse sectional view taken along the line II-II of FIG. 1, and wherein the scoop is illustrated, for sliding along the inner surface of the chute.

FIG. 2 is a sectional view taken along the line II-II of FIG. 1 showing the scoop 80 positioned proximate the chute wall 66.

Figure 3:
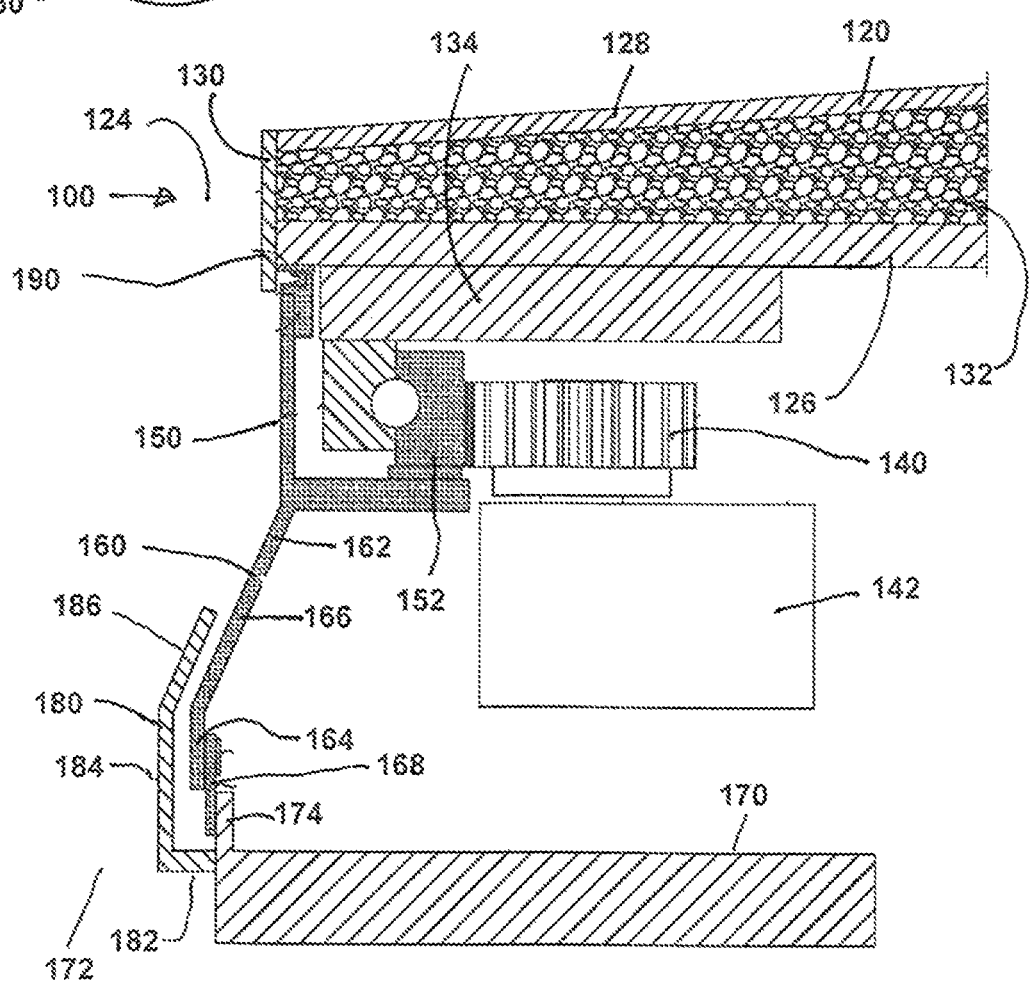
FIG. 3 is an illustration like that of FIG. 1, but of an alternative embodiment, showing an alternative scheme for mounting the rotatable chute on a sludge storage bin.

FIG. 3 is a fragmentary sectional view of another embodiment of the sludge handling system 100 of the present invention. The sludge handling system 100 includes a bin 120 having a central discharge opening 124 formed in the bottom 126 of the bin 120 with sloped surface portions 128 extending down from vertical side walls (not shown) to the central discharge opening 124. Support material 132 is located under the sloped surface portions 128 and above the bottom 126 of the bin 120. A generally circular support ring 134 extends down from the bottom 126 of the bin surrounding the central discharge opening 124. A rotatable discharge means or device 150 is rotatably mounted on the support ring 134 with suitable bearings. The rotatable discharge means 150 preferably includes an arm extending within the bin 120 to scrape the interior surface of the bin (not shown). The rotatable discharge device 150 includes a generally circular rotatably driven table or ring 152 which includes a bearing with a plurality of teeth on its peripheral surface for engagement with a spur gear 140. The spur gear 140 is driven by a fixed or variable speed motor 142 to turn the rotatable discharge device 150. The rotatable discharge device 150 also includes a rotationally symmetric, generally frusto-conical chute 160 having an upper end 162 having a larger diameter than the lower end 164 of the chute 160, with a wall 166 extending therebetween. The sludge handling system 100 also includes a discharge gate 170 having an aperture 172 through which sludge can be discharged to the bed of a waiting truck (not shown). An upstanding gate wall 174 surrounds the aperture 172 in the gate 170, and a peripheral, preferably elastomeric seal 168 is provided between the lower end 164 of the chute 160 and the gate wall 174 to prevent loss of sludge during transfer. A stationary scoop 180 extends from the gate 170 up into the chute 160 proximate the chute wall 166 to dislodge sludge from the interior of the chute wall 166 as the chute 160 rotates. The scoop 180 includes a generally lower portion 182 affixing scoop 180 to the gate 170, a generally vertical middle portion 184, and a upper portion 186 angled to approximate the angle of the chute wall 166. A peripheral, preferably elastomeric, seal 190 is also provided between the rotatable discharge device 150 and the bin 120 to prevent loss of sludge during transfer. The peripheral seal 190 is in sliding engagement against the bin 120 at bottom central discharge opening 124 of the bin 120.

It will be apparent from the foregoing that various modifications may be made in the apparatus described above, as well as in the use and operation of the same, as may suggest themselves to those skilled in the art, upon a reading of the specification, all within the spirit and scope of the invention, as defined in the appended claims.

The invention claimed is:

1. A sludge handling system comprising:
    at least one bin from which bin treated sewage sludge is discharged;
    the at least one bin having an inlet at an upper end for receiving sludge therein, a bottom central discharge opening for discharge of sludge therethrough, and side wall(s), at least portions of the side wall(s) being generally conically sloped toward the bottom central discharge opening,
    a rotatable discharge means including a rotably driven table;
    the rotatable discharge means including at least one arm having an upper portion and a lower portion, the at least one arm being mounted for traversing proximate the sloped portions of the side wall(s) of the at least one bin, and for moving sludge from the sloped portions of the side wall(s) so that the sludge does not adhere to the sloped portions of the side wall(s) and is directed out the bottom central discharge opening;
    the rotatable discharge means including a rotationally symmetric chute, the rotationally symmetric chute having an upper end for receiving sludge from the bottom central discharge opening of the at least one bin, a lower end for discharging sludge, and a wall extending between the upper end of the chute and the lower end of the chute, the lower portion of the at least one arm being mounted on the rotably driven table;
    a discharge gate having an opening for receiving sludge from the lower end of the chute, the discharge gate including at least one scoop extending into the chute proximate the wall for dislodging sludge from the wall.

2. A system according to claim 1, wherein the rotatably driven table includes motor means for driving the table from a periphery of the table.

3. A system according to claim 1 wherein the chute is generally conical, the upper end of the chute having a greater diameter than the diameter of the lower end of the chute.

4. A system according to claim 1, further including sealing means providing a peripheral seal between said bottom discharge opening of said bin and said rotatably driven table.

5. A system according to claim 4, wherein said peripheral seal is carried by said rotatably driven table, for rotation therewith.

6. A system according to claim 5, wherein said peripheral seal is in sliding engagement against the bin at the bottom central discharge opening of the bin.

7. A system according to claim 1, wherein said rotably driven table is generally rotationally symmetric.

8. A system according to claim 1, wherein the sloped portions of the side wall(s) of the at least one bin have lower end(s) that terminate in the bottom central discharge opening, and wherein the bottom central discharge opening of the bin is generally cylindrical.

9. A system according to claim 1, wherein the opening of the gate is rotationally symmetric.

10. A system according to claim 9, further including sealing means providing a peripheral seal between the lower end of the chute and the opening of the gate.

11. A system according to claim 10, wherein the peripheral seal is carried by the chute.

12. A system according to claim 10, wherein the peripheral seal is in sliding engagement against the gate at the lower end of the chute.

13. A system according to claim 1 wherein the sloped portions of the side wall(s) of the bin have lower end(s) that terminate in the discharge opening, and wherein the discharge opening is generally cylindrical.

14. A system according to claim 1, wherein the at least one arm comprises a means for scraping sludge from the sloped portions of the side wall(s).

15. A system according to claim 1, wherein at least one arm is substantially at the same angle to the vertical as the sloped portions of the side wall(s).

16. A system according to claim 1, wherein the at least one arm is selectively rotatable depending upon the volume of sludge in the bin.

* * * * *